United States Patent [19]

Sugiyama et al.

[11] 4,413,299

[45] Nov. 1, 1983

[54] STATE INDICATING DEVICE IN A ROTARY RECORDING MEDIUM REPRODUCING APPARATUS

[75] Inventors: Hiroyuki Sugiyama, Isehara; Masaki Sakurai; Ryuzo Abe, both of Yokohama; Yasuhiro Yusa, Fujisawa; Kenji Yoshihara, Chiba, all of Japan

[73] Assignee: Victor Company of Japan, Ltd., Yokohama, Japan

[21] Appl. No.: 287,986

[22] Filed: Jul. 29, 1981

[30] Foreign Application Priority Data

Jul. 29, 1980 [JP] Japan .......................... 55-107290[U]

[51] Int. Cl.³ .......................... G11B 5/82; G11B 19/10
[52] U.S. Cl. .................................... 360/137; 360/97; 360/133
[58] Field of Search .................. 360/137, 135, 86, 97, 360/99, 69, 71, 133; 369/77

[56] References Cited

U.S. PATENT DOCUMENTS 3,662,360  5/1972  Lambert ................................ 360/97
4,266,784  5/1981  Torrington ........................... 360/133

FOREIGN PATENT DOCUMENTS 1104206  4/1961  Fed. Rep. of Germany .
2155910  4/1973  Fed. Rep. of Germany .

OTHER PUBLICATIONS

"Patent Abstracts of Japan", Feb. 21, 1980, vol. 4, No. 21, ad Kokai No. 54-16 02 06.
"Patents Abstracts of Japan", Mar. 28, 1980, vol. 4, No. 39, ad 55-12 580 (A), ad 55-12 582 (A).
"Patents Abstracts of Japan", Apr. 17, 1980, vol. 4, No. 51, ad 55-22266 (A).

*Primary Examiner*—Alfred H. Eddleman
*Attorney, Agent, or Firm*—Louis Bernat

[57] ABSTRACT

A state indicating device in a reproducing apparatus for reproducing a rotary recording medium recorded with signals which has been accommodated within a case, where the case has a space for accommodating the rotary recording medium, a jacket having an opening through which the rotary recording medium can enter or leave, and a lid plate inserted through the opening of the jacket to close the opening, and the reproducing apparatus has an inserting opening through which the case is inserted, a turntable for rotating the rotary recording medium, a lid plate locking mechanism and a rotary recording medium clamping mechanism respectively provided at the innermost part of the reproducing apparatus opposite to the inserting opening with respect to the turntable, a lowering and raising mechanism for lowering and raising the rotary recording medium between a position clamped by the clamping mechanism and a position on the turntable, reproducing device for reproducing recorded signals from the rotary recording medium, and a transferring mechanism for transferring the reproducing device over the rotary recording medium, the state indicating device comprises a first display for indicating a state possible for inserting the case into the reproducing apparatus, a second display for indicating a reproduction stand-by state in which the rotary recording medium is placed onto the turntable within the reproducing apparatus, a third display for indicating a reproducing state in which the rotary recording medium is being reproduced by the reproducing means, a fourth display for indicating a state possible for recovering the rotary recording medium outside of the reproducing apparatus, by inserting an empty jacket into the reproducing apparatus to accommodate the rotary recording medium within the jacket, and a detecting and driving circuit for detecting states of the reproducing apparatus and selectively driving displays of the first through fourth displays.

5 Claims, 4 Drawing Figures

STATE INDICATING DEVICE IN A ROTARY RECORDING MEDIUM REPRODUCING APPARATUS

BACKGROUND OF THE INVENTION

The present invention generally relates to state indicating devices in rotary recording medium reproducing apparatuses, and more particularly to a state indicating device for displaying operational states of a reproducing apparatus outside thereof, in a rotary recording medium reproducing apparatus having a construction in which the operational state within the reproducing apparatus is difficult to observe.

Conventionally, disc cases constructed to accommodate a rotary recording medium (hereinafter simply referred to as a disc) within a jacket and having a lid member for closing an opening of the jacket, in order to protect the disc from scratches, dirt, dust particles, and the like, have been proposed and reduced to practical use. A reproducing apparatus for reproducing a disc by operating together with the above type of a disc case is constructed so that the disc is clamped and left at a predetermined position inside the reproducing apparatus by an operation in which the disc case accommodating the disc therein is inserted into and then pulled out from the reproducing apparatus, and the disc left inside the reproducing apparatus is recovered within the case by an operation in which the empty disc case is inserted into and then pulled out from the reproducing apparatus.

In the above described type of a reproducing apparatus, the operator can reproduce a disc without directly handling the disc. However, since the above disc case is inserted into and pulled out from the reproducing apparatus through a long and narrow opening of the reproducing apparatus, the operator cannot see the inside of the reproducing apparatus from the outside, and thus, the operational state inside the reproducing apparatus cannot be known. Therefore, it is desirable to construct the reproducing apparatus so that the operational state within the reproducing apparatus can be confirmed visually from outside the reproducing apparatus.

SUMMARY OF THE INVENTION

Accordingly, it is a general object of the present invention to provide a novel and useful state indicating device in a rotary recording medium reproducing apparatus, in which the above described desires have been satisfied.

Another and more specific object of the present invention is to provide a state indicating device capable of displaying operational states inside a rotary recording medium reproducing apparatus. According to the device of the present invention, an operator can easily know the operational states of the reproducing apparatus from outside thereof, in reproducing apparatuses having a construction in which the inside of the reproducing apparatus cannot be observed.

Still another object of the present invention is to provide a state indicating device capable of displaying the operational states such as a state possible for loading the disc, a state possible for reproduction, a reproducing state, a state possible for recovering the disc, and the like of the reproducing apparatus, so that the operational state of the reproducing apparatus can be observed from the outside.

Other objects and further features of the present invention will be apparent from the following detailed description when read in conjunction with the accompanying drawings.

DETAILED DESCRIPTION

Figure 1:
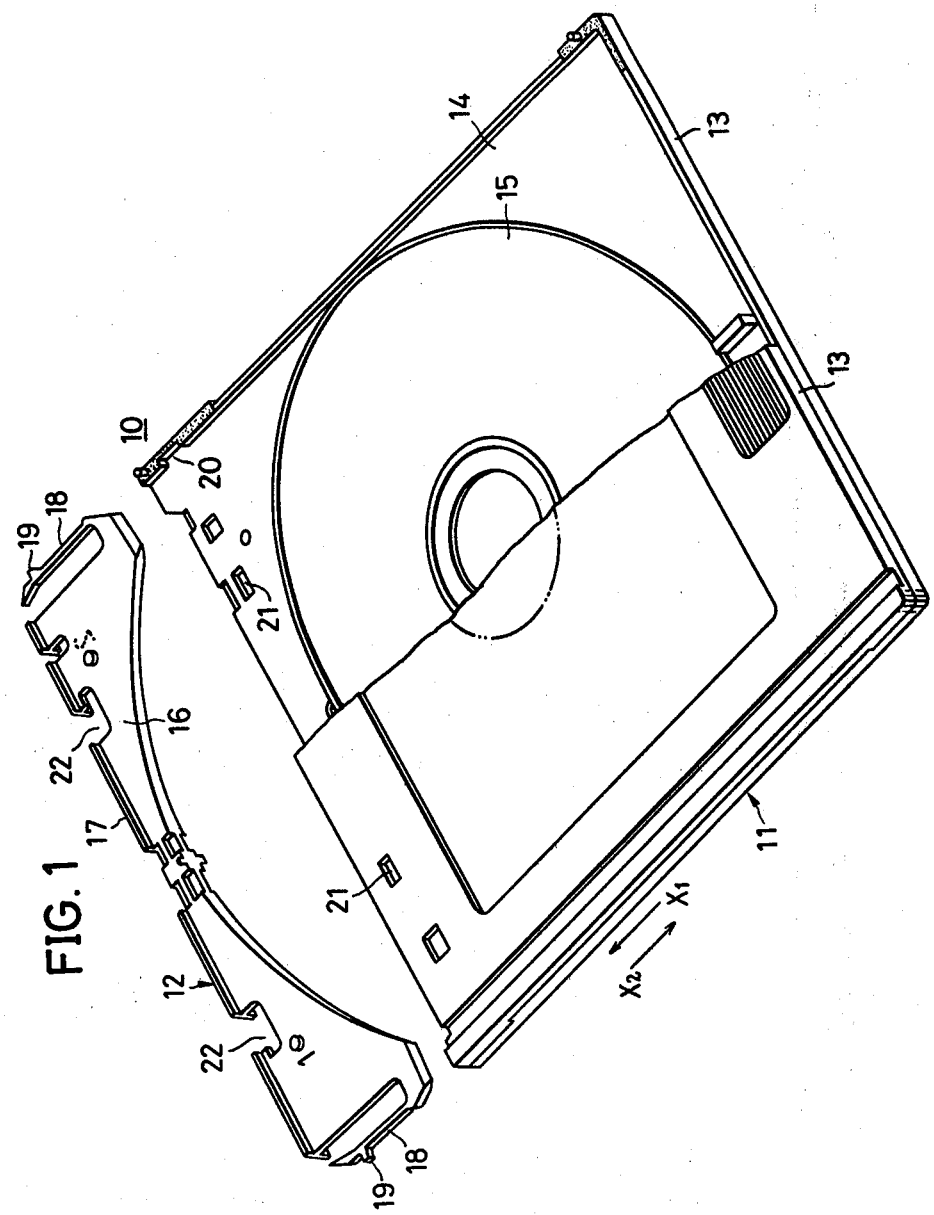
FIG. 1 is a perspective view, with a part cut away, showing an example of a disc case which operates together with a rotary recording medium reproducing apparatus.

In FIG. 1, a disc case 10 comprises a jacket 11 and a lid plate 12.

The Jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
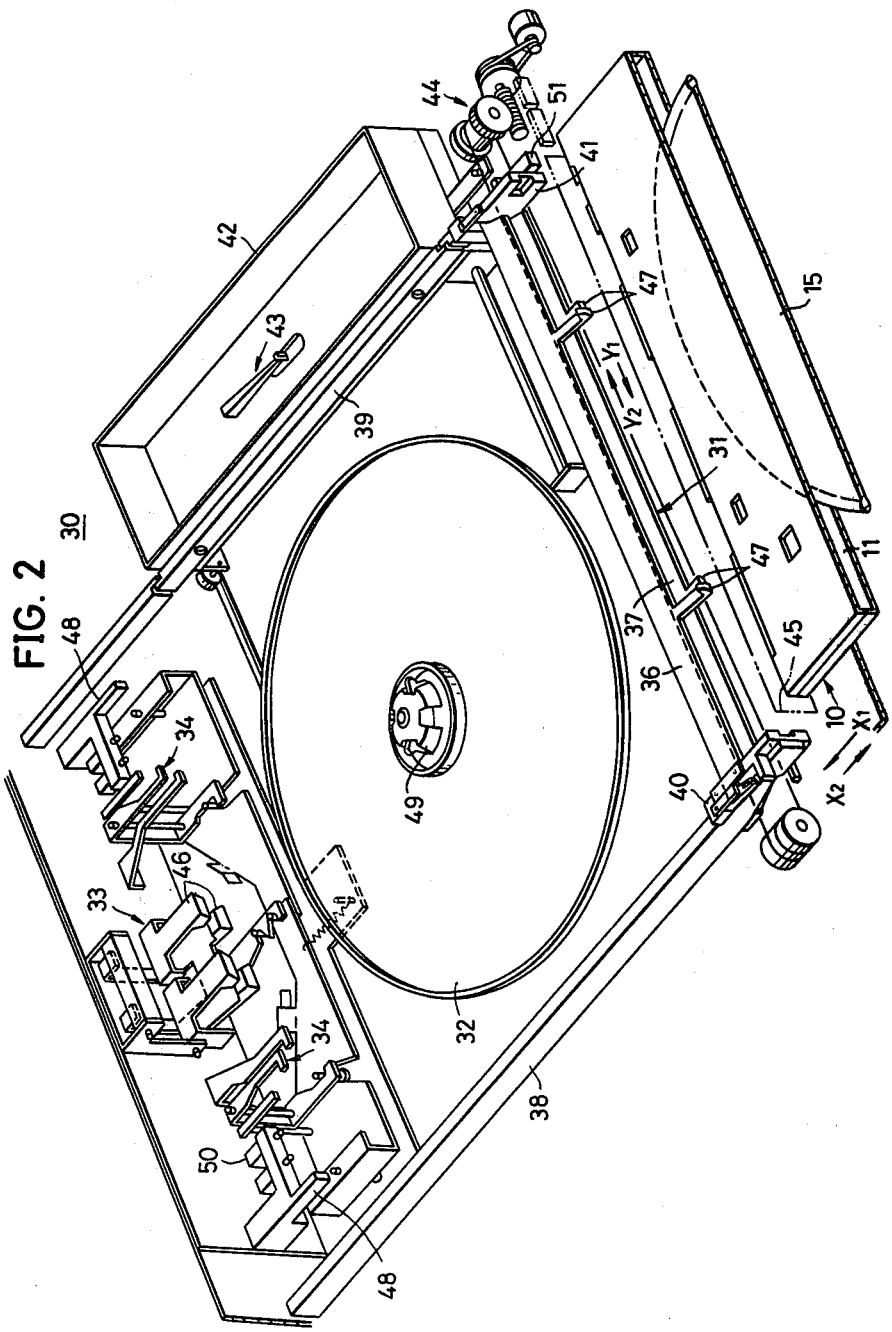
FIG. 2 is a diagram showing an essential part of an example of a rotary recording medium reproducing apparatus applied with a state indicating device according to the present invention, in a state where the outer casing of the reproducing apparatus is omitted.

As shown in FIG. 2, a reproducing apparatus 30 substantially comprises a jacket opening enlarging mechanism 31, a turntable 32 to rotate the disc 15 positioned thereon, a disc holding mechanism 33 for clamping the disc 15, a lid plate locking mechanism 34 for locking the lid plate 12, and the like.

The jacket opening enlarging mechanism 31 comprises upper and lower beams 36 and 37 extending in the directions of the arrows Y1 and Y2, and the supporting members 40 and 41 (sliders) which are respectively fixedly inserted into the guide rails 38 and 39, to support both ends of the respective beams 36 and 37.

A pickup frame 42 is provided with a pickup device 43 including a reproducing stylus, and is transferred towards the directions of the arrows Y1 and Y2 by a transferring mechanism 44.

The disc holding mechanism 33 is provided at the inner part of the reproducing apparatus 30 on the opposite side of an inserting opening 45, and comprises a pair of upper and lower holding fingers 46.

Upon reproduction of the disc 15, the disc case 10 is inserted through the inserting opening 45 of the reproducing apparatus 30, by inserting the disc case 10 with the side of the lid plate 12 into the direction of the arrow X1. When the jacket opening enlarging mechanism 31 is pushed and moved in the direction of the arrow X1 by the disc case 10, the enlarging mechanism 31 moves, the upper and lower beams 36 and 37 rotate, and enlarging fingers 47 thus respectively move in directions to mutually separate from each other. Accordingly, the tip ends of the enlarging fingers 47 engage with engaging windows 21 of the jacket 11, and enlarge the front part of the upper and lower jacket halves 13 upwards and downwards, to enlarge the opening.

When the disc case 10 is inserted into the innermost part of the reproducing apparatus 30 together with the enlarging mechanism 31 through the upper side of the turntable 32, cutouts 22 of the lid plate 12 is locked by the lid plate locking mechanism 34. Hence, the lid plate 12 is locked and held at the innermost part of the reproducing apparatus 30.

Furthermore, engagement releasing members 48 enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11. Further, the disc 15 is held at a predetermined height by the holding fingers 46.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11. The disc 15 is supported horizontally directly above the turntable 32 by the holding fingers 46 and a disc clamping mechanism 49 which is in a raised position, in a state where the jacket 11 is completely pulled out from the reproducing apparatus 30.

Figure 3:
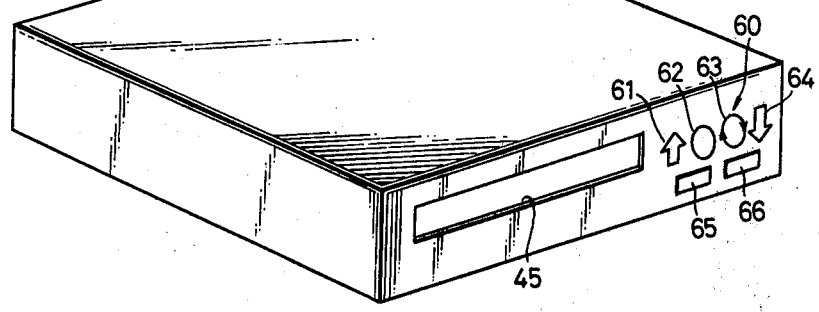
FIG. 3 is an outer perspective view showing a rotary recording medium reproducing apparatus applied with a state indicating device according to the present invention.

When a start button 65 shown in FIG. 3 is pushed, the disc holding mechanism 33 releases the holding operation, and the disc clamping mechanism 49 is lowered. The disc 15 is lowered onto the turntable 32, and rotated towards the clockwise direction. Further, the pickup frame 42 moves in the direction of the arrow Y1 from a waiting position, and the disc 15 is relatively scanned by the reproducing stylus of the pickup device 43, to reproduce the information signal.

Next, an operation in which the disc 15 is recovered from within the reproducing apparatus 30, will now be described.

Upon completion of the reproducing operation, the disc clamping mechanism 49 is raised to push the disc 15 up. In addition, the holding fingers 46 hold the disc 15 which is at a pushed-up position.

When the jacket 11 is inserted into the innermost position inside the reproducing apparatus 30, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening. Further, the lid plate locking mechanism 34 releases the lid plate 12.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

A lid plate lock detection switch 50 is provided at the innermost part of the reproducing apparatus 30, in the vicinity of the lid plate locking mechanism 34. The lid plate lock detection switch 50 is closed when pushed by the lid plate 12 upon insertion of the lid plate 12 into the innermost part of the reproducing apparatus 30 together with the jacket 11. Moreover, the lid plate lock detection switch 50 is closed during the time when the lid plate 12 is locked. Accordingly, the lid plate lock detection switch 50 opens when the lid plate 12 separates from the lid plate locking mechanism 34 upon recovering of the lid plate within the jacket 11 together with the disc 15, by inserting an empty jacket 11 into the reproducing apparatus. Furthermore, a detection switch 51 is provided at a position so as to operate together with the slider 41, and the insertion of the jacket 11 can be detected due to the opening (or closing) of the detection switch 51 when the slider 41 is operated by inserting the jacket 11 through the inserting opening 45. In addition, although not shown in FIG. 2, a detection switch 70 (shown in FIG. 4) is also provided in the reproducing apparatus, where the detection switch 70 is opened (or closed) when the pickup frame 42 is at a resting position shown in FIG. 2. The detection switch 70 is closed (or open) when the pickup frame 42 is not at the resting position, to detect that the pickup frame 42 is not at the resting position. Although not shown in FIG. 2, a switch 71 (shown in FIG. 4) is further provided below the turntable 32 in FIG. 2, to detect the raising or lowering states of the disc clamping mechanism 49.

Next, an embodiment of an indication device according to the present invention will be described in conjunction with FIGS. 2 through 4. In a state before the disc case 10 is inserted into the reproducing apparatus 30, the detection switch 50 is open. Accordingly, a lid plate lock detection circuit 72 does not detect the locking of the lid plate 12.

When the disc case 10 is to be inserted into the reproducing apparatus 30 upon reproduction of the disc 10, it is first necessary to confirm whether the reproducing apparatus 30 is in a state where the disc case 10 can be inserted into the reproducing apparatus 30.

When a load/eject button 66 is pushed in this state, a load/eject switch 66A becomes closed. Hence, the disc clamping mechanism 49 is raised, and the detection switch 71 becomes closed, to produce an output from a clamping mechanism position detection circuit 73. The detection circuit 72 produces a signal a for indicating state possible for loading, according to outputs from the switch 66A and the detection circuit 73, and supplies this signal a to an indicator driving circuit 74. Hence, a display element 61 for indicating a state possible for loading by showing an arrow facing up within a display part 60 is driven and illuminated, for example, to indicate a state possible for loading. This display indicated that the disc case 10 can be inserted into the reproducing apparatus 30.

When the disc case 10 is inserted into the inner part of the reproducing apparatus 30 through the inserting opening 45, the jacket opening enlarging mechanism 31 operates as described above. Therefore, when the slider 41 moves, the detection switch 51 operates to produce an output signal c from a detection circuit 79. This output signal c is supplied to a detection circuit 78. When the disc case 10 is inserted into the innermost part of the reproducing apparatus 30, and the lid plate 12 is locked by the lid plate locking mechanism 34, the detection switch 50 is closed. Accordingly, the detection circuit 72 detects that the lid plate 12 is in a locked state, and supplies an output signal b to the detection circuit 78.

The disc 15 is left inside the reproducing apparatus 30 in a state where the disc 15 is held by the above lid plate 12 and the disc holding mechanism 33, when the jacket 11 is pulled out from the reproducing apparatus 30. As the empty jacket 11 is pulled outside the inserting opening 45, the detection circuit 79 detects that the jacket 11 has moved outside the reproducing apparatus 30, and the above output signal c is no longer produced. Hence, the disc clamping mechanism 49 is lowered, and the disc 15 is placed onto the turntable 32. The detection circuit 78 produces a signal d for indicating a state possible for reproduction (reproduction stand-by state), by detecting that the lid plate lock detection signal b from the detection circuit 72 exists, the signal c from the detection circuit 79 does not exist, and the pickup frame 42 which is being detected by the switch 70 is in the resting position. The above signal d is supplied to the indicator driving circuit 74 to turn the illumination of the display element 61 OFF. The signal d is also supplied to an indicator driving circuit 75, to drive and illuminate a display element 62 for indicating a reproduction stand-by state by showing a ring mark. Accordingly, the reproduction stand-by state is thus indicated.

Next, when the start button 65 is pushed to start reproduction, a start switch 65A becomes closed, to put the reproducing apparatus 30 in a state possible for performing reproduction. Accordingly, the pickup frame 42 is transferred towards the direction of the arrow Y1 from the resting position. Thus, the pickup frame 42 reaches a position over the disc 15, and the pickup device 43 reproduces the signal recorded in the disc 15. At this point, the detection circuit 78 detects that the pickup frame 42 is not at the resting position by the switch 70. Further, due to the fact that signals b and e exist and the signal c does not exist, the detection circuit 78 produces a signal f for indicating a reproducing state. The above signal f is supplied to the indicator driving circuit 75, to turn OFF the illumination of the display element 62. Moreover, the signal f is also supplied to an indicator driving circuit 76, to drive and illuminate a display element 63 for indicating a reproducing state by showing a ring mark. Therefore, the display in the display part 60 changes from the reproduction stand-by display to the reproducing display. Since the pickup frame 42 is not at the resting position during modes such as a so-called pause mode in which the reproducing operation is once interrupted by temporarily stopping the transferring operation of the pickup frame 42, and a so-called search mode in which the pickup frame 42 is transferred at a high speed to search for a desired reproduction starting position, the display in the display element 63 remains.

When the reproduction of the disc 15 is completed and the pickup frame 42 is transferred towards the direction of the arrow Y2 to the resting position, the detection circuit 78 detects that the pickup frame 42 has returned to the resting position, by the switch 70. Accordingly, the signal f from the detection circuit 78 disappears. Thus, the display in the display element 63 disappears, and a display again appears in the display element 62. Therefore, the display in the display part 60 changes from the reproducing display to the reproduction stand-by display.

Upon recovering of the disc 15, the load/eject button 66 is pushed, to confirm whether it is possible to recover the disc 15. By this operation, the switch 66 becomes closed. Hence, the disc clamping mechanism 49 rises and raises the disc 15 to a height where the disc 15 can be recovered by the jacket 11. Therefore, the detection circuit 73 detects that the disc is in a raised state, by the detection switch 71. At this point, the lid plate 12 remains in a locked state, and the switch 50 remains closed. Thus, a signal g for indicating a state possible for recovering the disc, is obtained from the detection circuit 72, and this signal g is supplied to the indicator driving circuit 75 and an indicator driving circuit 77. Accordingly, the display in the display element 62 disappears. On the other hand, a display element 64 for indicating a state possible for recovering the disc by showing an arrow facing down, is illuminated. Hence, the display in the display part 60 changes from the reproduction stand-by display to the display indicating a state possible for recovering the disc.

When the empty jacket 11 is inserted through the inserting opening 45, to recover the disc 15 and the lid plate 12 upon pulling out the jacket 11 from within the reproducing apparatus 30 as described above, the switch 50 becomes open. Further, the switch 51 detects that the slider 41 has returned to the original position, and the display in the display element 64 disappears.

The shapes of the above display elements 61 through 64 of the display part 60 are not limited to the above embodiments, however, a letter display or a display using sounds can be used.

Figure 4:
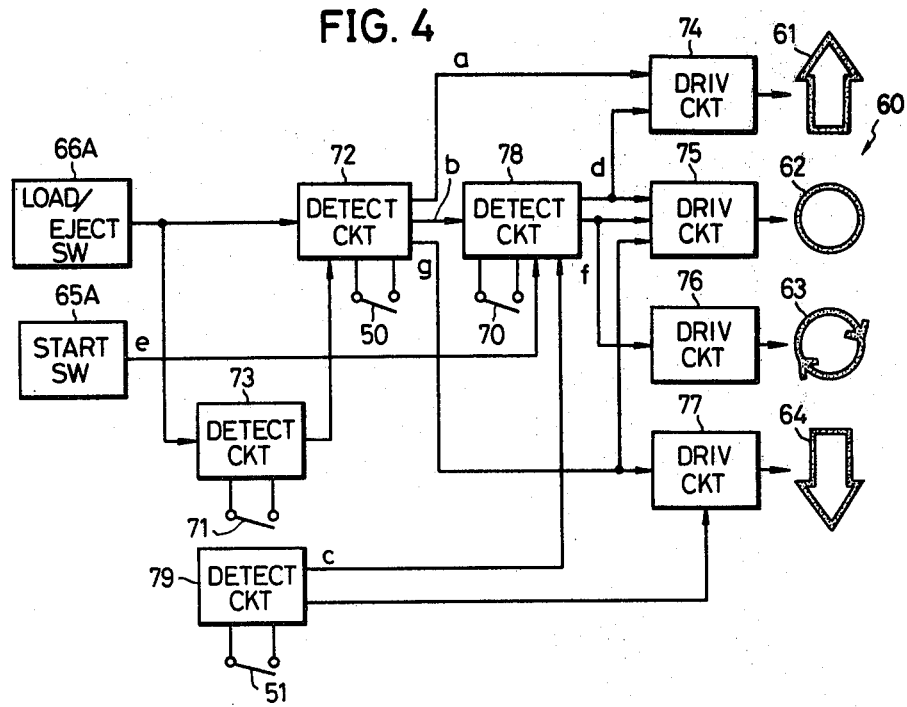
FIG. 4 is a systematic block diagram showing an embodiment of a state indicating device according to the present invention.

In the above embodiment of the invention, the circuit shown in FIG. 4 is constructed from a block system having the detection circuits 72, 73, 78, and 79 and the indicator driving circuits 74 through 77. However, in actual use, the functions of the above circuits can be realized by the operation of a micro-computer, and the device according to the present invention is not limited to the above described construction of the block system.

Further, this invention is not limited to these embodiments but various variations and modifications can be made without departing from the scope of the invention.

What is claimed is:

1. A state indicating device in an apparatus for reproducing a rotary recording medium having recorded signals, said medium being accommodated within a space in a case, a jacket having an opening through which said rotary recording medium can enter or leave, and a lid plate inserted through the opening of said jacket to close said opening, said reproducing apparatus having an inserting opening through which said case is inserted, a turntable for rotating said rotary recording medium, lid plate locking means and rotary recording medium clamping means respectively provided at the innermost part of said reproducing apparatus opposite to said inserting opening with respect to said turntable, lowering and raising means for lowering and raising said rotary recording medium between a position clamped by said clamping means and a position on said turntable, reproducing means for reproducing recorded signals from said rotary recording medium, and transferring means for transferring said reproducing means over said rotary recording medium, said state indicating device comprising:

first display means for indicating a state when it is possible to insert said case into said reproducing apparatus;

second display means for indicating a reproduction stand-by state in which said rotary recording medium is placed onto said turntable within said reproducing apparatus;

third display means for indicating a reproducing state in which said rotary recording medium is being reproduced by said reproducing means;

fourth display means for indicating a state when it is possible to recover said rotary recording medium from outside of said reproducing apparatus, said recovery being accomplished by inserting an empty jacket into said reproducing apparatus to accommodate said rotary recording medium within said jacket; and detecting and driving means for detecting the states of said reproducing apparatus and for selectively driving the displays of said first through fourth display means, said detecting and driving means having a first switch for detecting that said lid plate is at a position in which it may be locked by said lid plate locking means, a second switch for detecting that said case or said jacket has been inserted into said inserting opening, a third switch for detecting the position of said reproducing means, a fourth switch for detecting the operational state of said lowering and raising means, and a circuit for detecting the state of said reproducing apparatus according to the detection state of said first, second, third, and fourth switch, to produce and supply a display signal to one of said first through fourth display means.

2. A state indicating device as claimed in claim 1 which further comprises a load switch to be operated before insertion of said case into said reproducing apparatus, said circuit producing a signal for driving said first display means according to a detected result obtained from an output of said load switch and said fourth switch.

3. A state indicating device as claimed in claim 1 in which, in a state where said first switch produces a detection output and said second switch does not produce a detection output in a state where said rotary recording medium is inserted within said reproducing apparatus together with said jacket and then placed onto said turntable, said circuit puts said first display means in a non-operational state and produces a signal to drive said second display means according to the existence of a detection output of said third switch indicating that said reproducing means has receded from above said rotary recording medium.

4. A state indicating device as claimed in claim 1 further having a start switch for starting reproducing operation of said reproducing apparatus, said circuit putting said second display means in a non-operational state and producing a signal for driving said third display means in response to the closing of said start switch, the detected result obtained by said third switch indicating that said reproducing means is over said rotary recording medium, the detection output of said first switch, and the non-existence of detection output in said second switch.

5. A state indicating device as claimed in claim 1 which further comprises an eject switch to be operated before recovery of said recording medium from the reproducing apparatus, in a state where said circuit is producing a signal for driving said third display means, said circuit puts said third display means in a non-operational state and produces a signal for driving said fourth display means in response to the output of said eject switch and the detected result obtained by said third switch upon completion of reproduction by said reproducing means where said reproducing means recedes from over said rotary recording medium.

* * * * *